US006938032B1

(12) United States Patent
Heath et al.

(10) Patent No.: US 6,938,032 B1
(45) Date of Patent: Aug. 30, 2005

(54) PRESENTATION BUILDER

(75) Inventors: Barbara Heath, Westford, MA (US); Joseph DiMare, Andover, MA (US); Nicholas d'Arbeloff, Belmont, MA (US)

(73) Assignee: Conjoin, Inc., Bedford, MA (US)

( * ) Notice: Subject to any disclaimer, the term of this patent is extended or adjusted under 35 U.S.C. 154(b) by 0 days.

(21) Appl. No.: 09/549,056

(22) Filed: Apr. 13, 2000

Related U.S. Application Data
(60) Provisional application No. 60/129,107, filed on Apr. 13, 1999.

(51) Int. Cl.[7] .............................................. G06F 17/30
(52) U.S. Cl. ..................... 707/2; 707/3; 707/7; 707/9; 707/10; 715/515; 715/516
(58) Field of Search .............................. 707/1–10, 513, 707/517; 345/335; 715/500, 501, 515–517

(56) References Cited

U.S. PATENT DOCUMENTS

| 5,493,677 | A | * | 2/1996 | Balogh et al. ........... 707/104.1 |
| 5,761,655 | A | * | 6/1998 | Hoffman ...................... 707/4 |
| 5,781,190 | A | * | 7/1998 | Gorbet et al. ............... 715/501 |
| 5,859,623 | A | * | 1/1999 | Meyn et al. ................ 345/730 |
| 6,078,921 | A | * | 6/2000 | Kelley ......................... 707/10 |
| 6,182,087 | B1 | * | 1/2001 | Lim .......................... 707/204 |
| 6,321,244 | B1 | * | 11/2001 | Liu et al. .................... 707/523 |
| 6,332,150 | B1 | * | 12/2001 | Khan et al. ................ 707/526 |
| 6,356,971 | B1 | * | 3/2002 | Katz et al. ................. 710/301 |

OTHER PUBLICATIONS

"Sams teach Yourself PowerPoint 97 in 10 Minutes by Wempen, Faithe" (Indianapolis, Ind. Sams Publishing, 1998, ISBN: 0672313715, eBook ISBN; 0585111642).*

* cited by examiner

Primary Examiner—Jean M. Corrielus
Assistant Examiner—Isaac Woo
(74) Attorney, Agent, or Firm—Choate, Hall & Stewart LLP

(57) ABSTRACT

The invention comprises a system for easily searching multiple multislide POWERPOINT™ presentations, selecting slides from each presentation, and combining them to form a new presentation. The user need not invoke POWERPOINT™ on the client in order to view the slides and create the new presention file for downloading in POWERPOINT™ format.

3 Claims, 5 Drawing Sheets

PRESENTATION BUILDER

This application claims priority to U.S. Provisional Application No. 60/129,107, filed Apr. 13, 1999, which is incorporated herein by reference.

FIELD OF THE INVENTION

The invention relates to a system for publishing POWERPOINT™ presentations so that individual slides from multiple presentations may be searched, accessed, and combined into a new presentation.

BACKGROUND OF THE INVENTION

A number of computer programs for organizing and presenting slide presentations are now available. However, Microsoft POWERPOINT™ has become the dominant presentation authoring program. POWERPOINT™ presentations can have very large file sizes, however, and they may become unwieldy when shared by many users. In addition, the program does not provide any way of searching within multiple presentation files to build upon past presentations in constructing a new presentation. A need thus exists for better tools to share, manipulate, and construct POWERPOINT™ presentations in a networked environment.

SUMMARY OF THE INVENTION

In one aspect, the invention includes a system for managing POWERPOINT™ presentations, and for building new presentations using slides from multiple existing presentations. A database of metadata on the presentations tracks the location of presentation files and the number of slides in each presentation. Upon adding a new presentation to the collection, the presentation is broken into multiple single-slide presentation files, which may then be searched and accessed. Searches can be performed which return identifying information for individual slides from multiple presentations.

BRIEF DESCRIPTION OF THE DRAWING

The invention is described with reference to the several figures of the drawing, in which.

DETAILED DESCRIPTION

Figure 1:
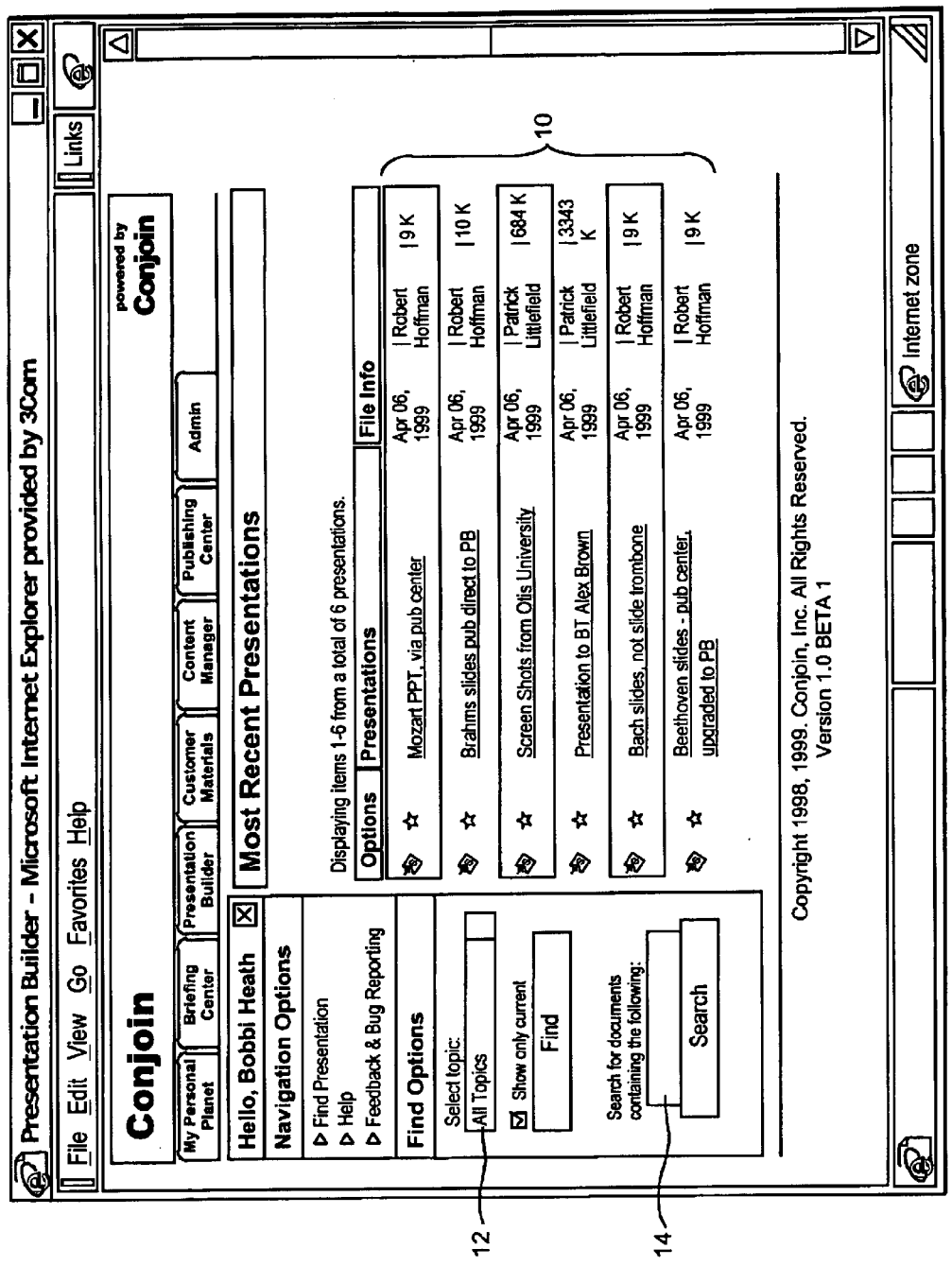
FIG. 1 shows a list of POWERPOINT™ presentations which have been catalogued for use with the invention.

POWERPOINT™, from Microsoft Corporation in Redmond, Wash., has become the tool of choice for creating and manipulating slide presentations. A POWERPOINT™ presentation file comprises one or more slide objects, which are fully described in the Microsoft COM object specification for POWERPOINT™ objects, incorporated herein by reference.

While it is possible to open multiple presentations within POWERPOINT™ to search for individual slides to create a new presentation, this is an unwieldy process, since entire presentations must be loaded into memory. If more than a very few presentations must be searched, this method quickly becomes untenable. The present invention provides a method for searching and viewing presentations at the granularity of a single slide, in order to build new presentations from presentations published, for example, on an intranet (or internet).

To enable searching and selecting slides without opening POWERPOINT™, the system creates a database of metadata on presentation files, indicating their location and the number of slides in each. When a presentation is added to the database, a single-slide POWERPOINT™ presentation file is created for each slide in the presentation. In addition, in preferred embodiments of the invention, .gif files (or other small viewable files) for each slide are also created, to allow fast viewing of the slides without opening the POWERPOINT™ application.

Once the single-slide presentation files have been created, they may be accessed and searched by conventional search engines. Using the metadata in the database, individual slides may be selected for incorporation into a new presentation file. In a client-server environment, the presentations may be stored on the server, and viewed on the client by way of the associated gif files. Once slides have been selected and a new presentation created, it may be downloaded in POWERPOINT™ format by the user.

EXAMPLE

The present invention is described herein with respect to an example of one preferred embodiment of the invention. This example should not be construed as limiting; variations will occur to those of ordinary skill in the art that remain within the scope and spirit of the invention. For example, file types, client-server configurations, and data storage methods may differ from those described herein without departing from the invention.

In one embodiment of the invention, Presentation Builder is based on a set of database tables that are a part of an overall intranet database. A goal is to do as much work as possible in the database application, rather than in POWERPOINT™.

Catalogued in the database tables are:

Pointers to each set of slides

Number of slides in each set

Stored on disk are:

POWERPOINT™ presentations

Individual slides making up each presentation as single .ppt files

Individual slides making up each presentation as individual .gif files

.ppt files are searchable and downloadable items

.gif files are viewable items

Search engine accesses:

Presentations

Individual slides in .ppt format

Creation of the individual slide .ppt and .gif files may be done by a disassembler tag (e.g., a COLD FUSION™ tag), which accesses POWERPOINT™ objects through the COM interface. The disassembler tag operates on the presentation after upload to server by the database application, disassembling the presentation into individual slides and generating a .gif version of each. Specifically, it will:

be passed the path/filename to the newly published presentation (e.g., pres.ppt) by the database application disassemble the presentation into individual slides (.ppt) and thumbnails (.gif)

create a folder, "pres" (named after the presentation filename)

create n .ppt files, each containing 1 slide (where n is the total number of slides in the presentation), named 1.ppt, 2.ppt, etc., as well as n .gif files, named 1.gif, 2.gif, etc.

pass back to the database application the value of n

Creation of new slide sets is done by an assembler tag (accessing POWERPOINT™ objects through the COM interface) which operates on the individual slides stored in .ppt format and combines them into a new POWERPOINT™ presentation. Specifically, it will

- be passed multiple path/filenames to the individual slide files (described above) that have been chosen by the user in the database application
- create a new POWERPOINT™ presentation with a unique name from this list
- store the new presentation
- pass the filename/path to the new presentation to the database application for downloading by the user Database Schema Two database tables are involved, the Library table which holds information about the original POWERPOINT™ presentations, including the location of the file and whether it has been broken into individual slides yet. The other is the presentations table which holds the number of slides resulting from processing each slide set (i.e., the number of slides contained in the original presentation). The relationships between the two copies of each slide and their parent slide set is held in these tables, thus using the database schema to model the object hierarchy instead of using the object hierarchy existing in POWERPOINT™.

Functions.

Publish Steps

Upload slide set as .ppt file to server

Enter library table information

Invoke disassembler tag, which:

Invokes the presentation in PowerPoint on server

Loop through slides—save a .ppt copy of each slide and a .gif of each slide

Exit PowerPoint on server

Enter into presentation table the number of slides

Search

Integrate search with the individual slides in .ppt format, preferably using commercial search engine such as Verity.

View

Results of search use the .gif files instead of the searched-on .ppt files, and preferably return only 10 at a time, with a buttons to go to the next 10, and back to the previous 10.

Create Pick List

Saves file names of individual slide .ppt files for download

Process New Slide Set Steps

Invoke PowerPoint on server creating a new presentation

Copy slides in pick list into new presentation

Save new presentation to a .ppt file

Exit PowerPoint on server

Present new presentation to the user, allowing invocation of PowerPoint on the client system in a new browser window if desired Retrieve Download to user chosen folder using Save As dialogue in browser Archive When a parent slide set is marked archive, its associated individual slide .ppt and .gif files are also archived.

Delete and Replace

When a parent slide set is deleted or replaced, in addition to the original .ppt file and the Library table entry, the folder and the .ppt and .gif files inside it, as well as the Presentations table entry are deleted or replaced also.

Figure 2:
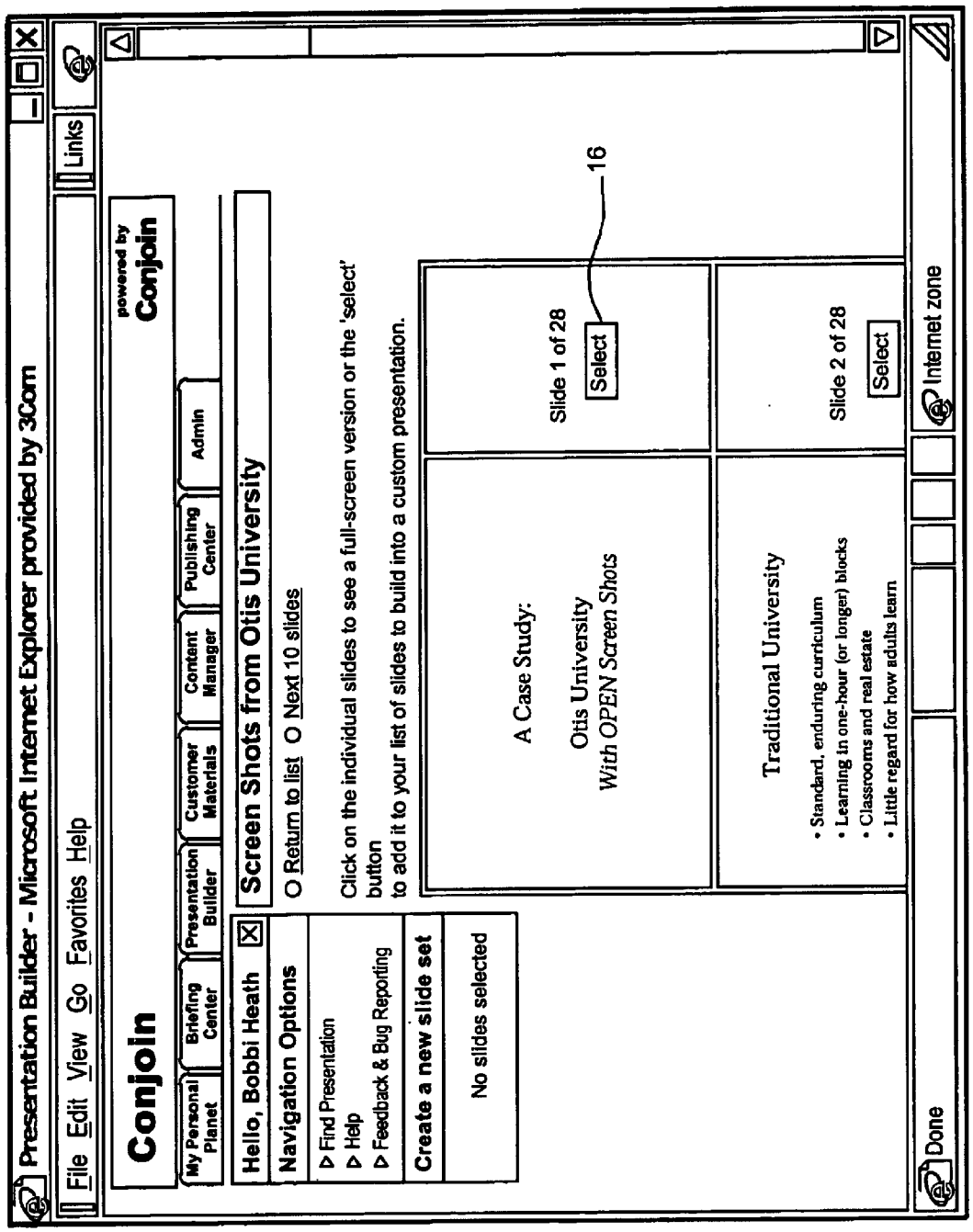
FIG. 2 shows a viewable set of slides from a single presentation.
Figure 3:
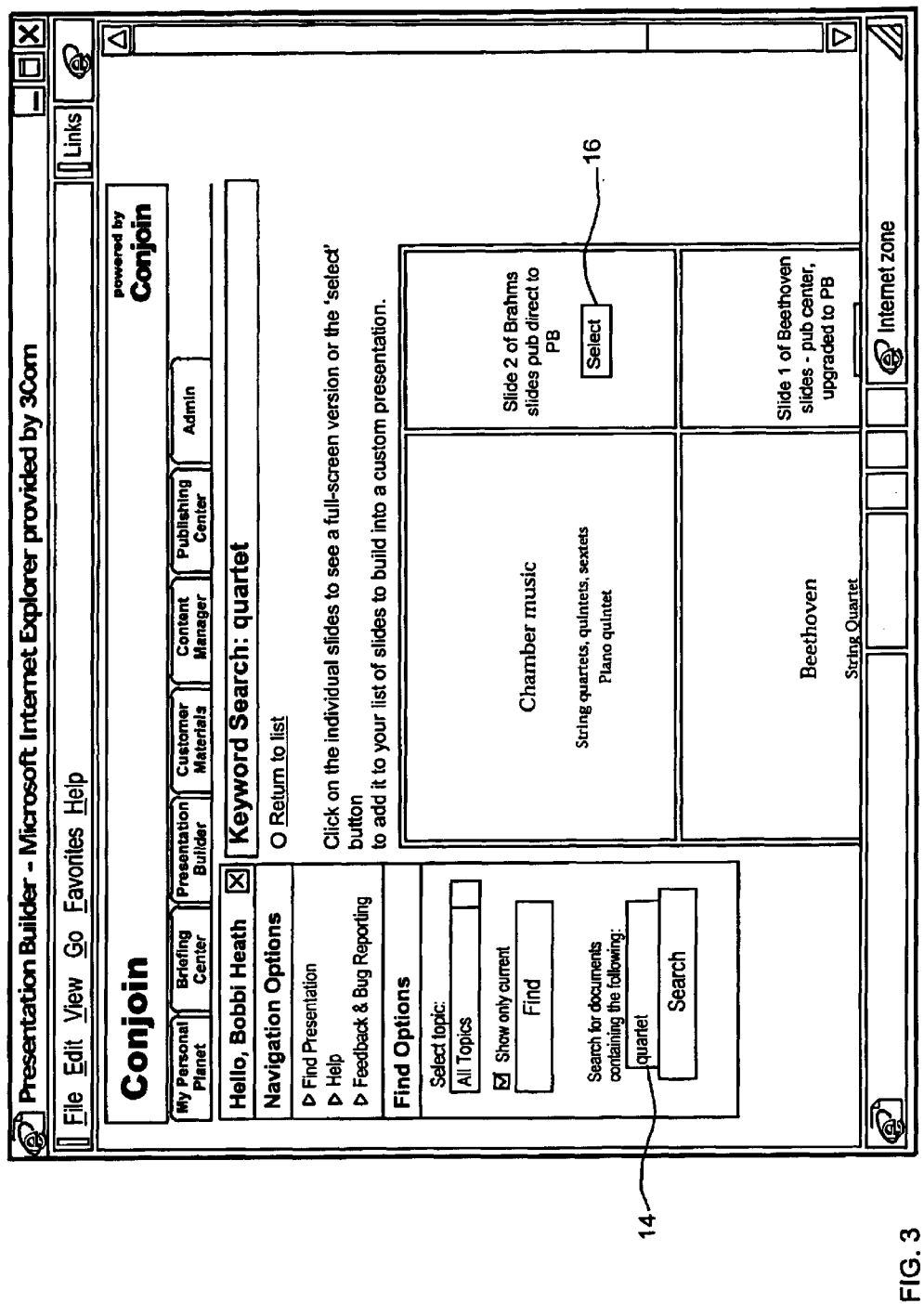
FIG. 3 shows the results of a search across multiple slide sets.

FIGS. 1–5 are a series of screen shots illustrating the process of viewing presentations, searching for individual slides, and creating a new presentation according to one embodiment of the invention. FIG. 1 shows a group of presentations 10 from which slides may be selected in building a new presentation. Presentations and/or individual slides may also be searched from a predetermined topic list 12, or by a keyword search 14. The user may click on a presentation to view its individual slides, as shown in FIG. 2, or may performa a search to view a collection of slides from different presentations, as shown in FIG. 3.

In preferred embodiments of the invention, slide presentations have a set of small associated viewing files (such as .jpg files). These allow the user to quickly review the slides and select any of interest, without requiring the client machine to run a POWERPOINT™ instance. Such a set of viewable slide files is shown within an HTML table in FIG. 2. The user may use the "Select" buttons 16 to add any of these slides to his or her new presentation.

In FIG. 3, the user has performed a keyword search 14 for the word "quartet," and has retrieves a group of slides from several different presentations. These may be added to the new presentation by using the "Select" button 16.

Figure 4:
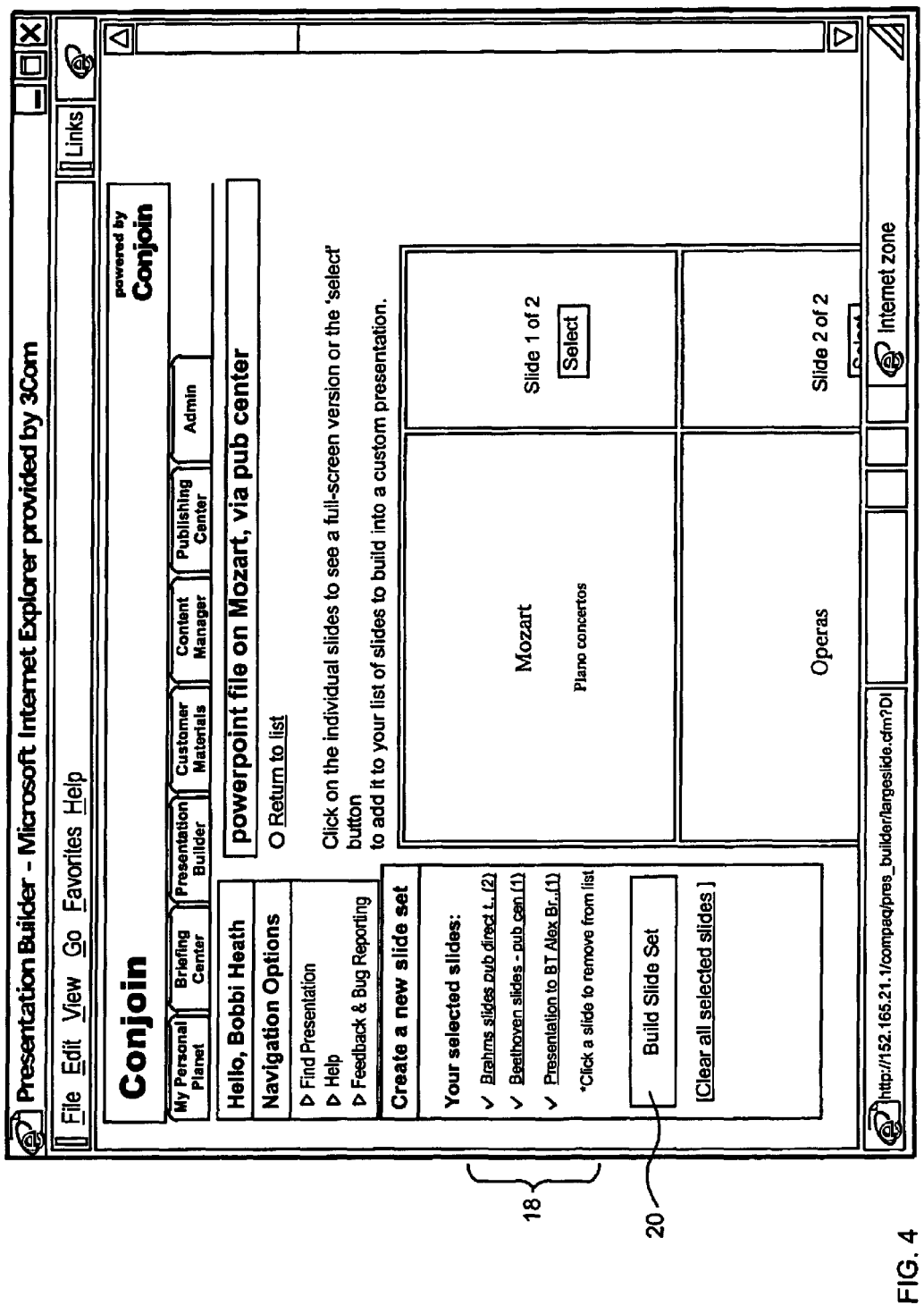
FIG. 4 shows a viewable set of slides from a single presentation.
Figure 5:
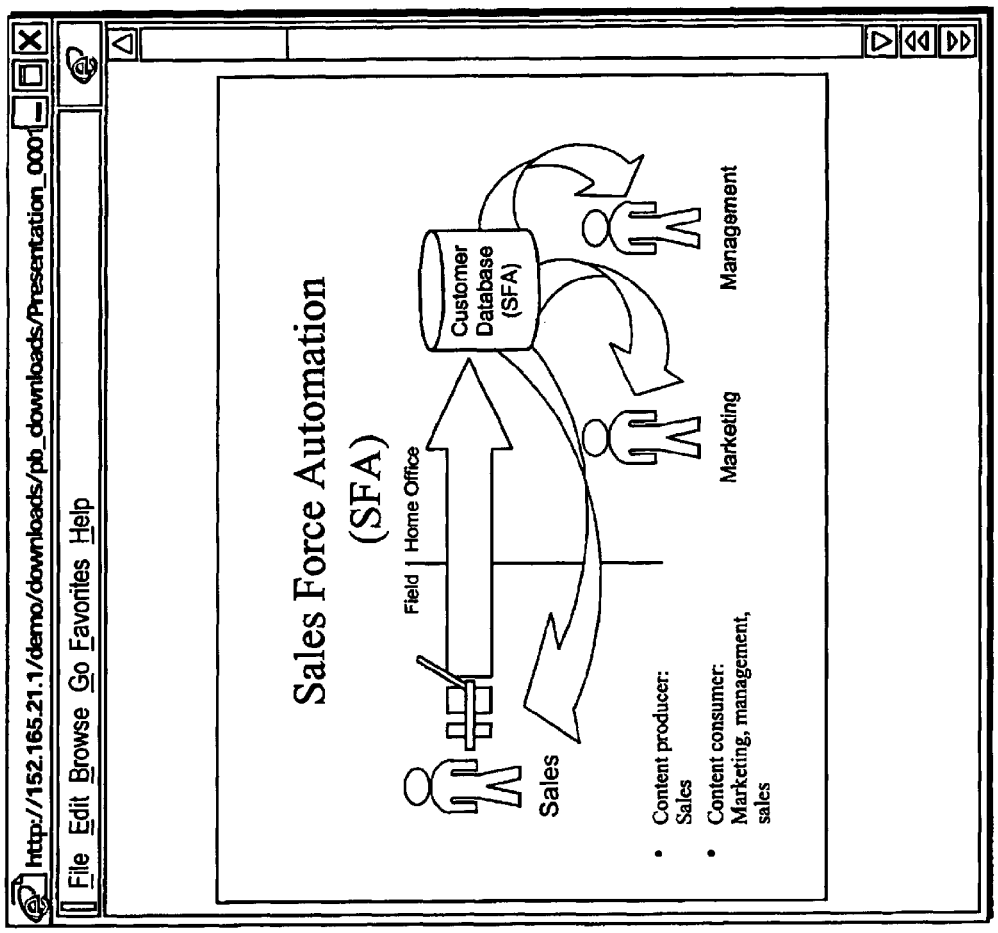
FIG. 5 shows a new POWERPOINT™ presentation assembled from existing slides according to the invention.

In FIG. 4, the user has begun to assemble the new presentation. The slide list 18 at left shows a summary of the slides which have already been added to the presentation, while the results of another search are being viewed in the main window. Once all the slides which the user wishes to use have been selected, he or she may use the "Build Slide Set" button 20 to create a new presentation file, as shown in FIG. 5. The selected slides are then assembled into a single .ppt file, which is downloaded to the client machine for further editing.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A computer-implemented method of storing and accessing a central database of metadata on multislide presentations, comprising:

adding an item of metadata to the database corresponding to a multislide presentation stored in a single file, where adding includes creating and saving to disk a plurality of single-slide presentation files outside the database, corresponding to the individual slides of the multislide presentation, and where the item comprises the number and location of the plurality of single-slide presentation files; and accessing the plurality of single-slide presentation files to search for slides meeting a selected criterion.

2. The method of claim 1, further comprising:

adding a second item of metadata to the database corresponding to a second multislide presentation; and creating a new presentation comprising selecting slides from each of the two multislide presentations, wherein the new presentation is stored in a single file.

3. The method of claim 1, further comprising:

storing a viewable file for each slide of the multislide presentation in the database, wherein accessing the plurality of single-slide presentations comprises viewing viewable files corresponding to the slides meeting the selected criterion.

* * * * *